United States Patent
Aoshima et al.

(10) Patent No.: US 9,172,879 B2
(45) Date of Patent: Oct. 27, 2015

(54) IMAGE DISPLAY CONTROL APPARATUS, IMAGE DISPLAY APPARATUS, NON-TRANSITORY COMPUTER READABLE MEDIUM, AND IMAGE DISPLAY CONTROL METHOD

(71) Applicant: FUJI XEROX CO., LTD., Minato-ku, Tokyo (JP)

(72) Inventors: Yuzo Aoshima, Tokyo (JP); Yuki Okabe, Tokyo (JP); Chinatsu Hisamoto, Tokyo (JP); Yasushi Ichinowatari, Kanagawa (JP); Tomohito Takagi, Kanagawa (JP); Yu Mishima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 2 days.

(21) Appl. No.: 13/859,425

(22) Filed: Apr. 9, 2013

(65) Prior Publication Data

US 2014/0092291 A1    Apr. 3, 2014

(30) Foreign Application Priority Data

Sep. 28, 2012   (JP) ................. 2012-218677

(51) Int. Cl.
  *H04N 5/232*   (2006.01)
  *H04N 1/00*   (2006.01)
  *G06F 17/30*   (2006.01)
  *H04N 1/32*   (2006.01)

(52) U.S. Cl.
  CPC ...... *H04N 5/23293* (2013.01); *G06F 17/30256* (2013.01); *H04N 1/00411* (2013.01); *H04N 1/00442* (2013.01); *H04N 1/00453* (2013.01); *H04N 1/00461* (2013.01); *H04N 1/32128* (2013.01); *G06F 17/30265* (2013.01); *H04N 2201/3214* (2013.01); *H04N 2201/3253* (2013.01); *H04N 2201/3266* (2013.01); *H04N 2201/3273* (2013.01); *H04N 2201/3277* (2013.01)

(58) Field of Classification Search
  USPC .......................................... 348/231.3, 231.5
  See application file for complete search history.

(56) References Cited

U.S. PATENT DOCUMENTS

| | | | |
|---|---|---|---|
| 6,738,075 B1 * | 5/2004 | Torres et al. | 715/723 |
| 7,929,029 B2 * | 4/2011 | Morimoto et al. | 348/231.6 |
| 8,346,771 B2 * | 1/2013 | Miyazaki | 707/737 |
| 2007/0085840 A1 * | 4/2007 | Asaka et al. | 345/173 |
| 2009/0201314 A1 * | 8/2009 | Tanaka et al. | 345/629 |
| 2010/0302429 A1 * | 12/2010 | Sakakima et al. | 348/333.05 |

FOREIGN PATENT DOCUMENTS

JP    2011-108190 A    6/2011

* cited by examiner

*Primary Examiner* — Albert Cutler
(74) *Attorney, Agent, or Firm* — Sughrue Mion, PLLC

(57) ABSTRACT

An image display control apparatus includes a memory, a determination unit, and a display controller. The memory stores plural sets of information each set including image information indicating an image to be displayed on a display and at least one attribute concerning the image information, which are associated with each other. When one of plural images displayed on the display is selected, the determination unit determines whether or not the image information stored in the memory includes image information stored in association with an attribute relevant to an attribute associated with the selected image. The display controller performs display control to display a mark for a relevant image when displaying the plural images on the display in accordance with the image information stored in the memory and displaying on the display a relevant image based on the image information included in the stored image information.

11 Claims, 12 Drawing Sheets

FIG. 3

| FILE NAME | CLASSIFICATION LABEL | PHOTOGRAPHER/ CREATOR | LOCATION OF IMAGE CAPTURE | DATE OF IMAGE CAPTURE/ DATE OF CREATION | RELEVANT INFORMATION | STORAGE LOCATION |
|---|---|---|---|---|---|---|
| fig1 | CAMERA A, LENS B | ALICE | FRANCE | 6/6/2012 | FRENCH CUISINE, ESCARGOT | ./img/fig1.jpg |
| fig2 | CAMERA C, LENS D | BOB | LAKE KAWAGUCHI | 6/7/2012 | LAKE KAWAGUCHI, BOAT, CAMPING | ./img/fig2.jpg |
| text1 | -- | CAROL | -- | 6/6/2012 | LAKE KAWAGUCHI, CAMPING, MEMBER | ./text/text1.jpg |
| folder1 | -- | DAVE | -- | 6/13/2012 | JOURNEY TO FRANCE | ./folder1 |
| ... | ... | ... | ... | ... | ... | ... |

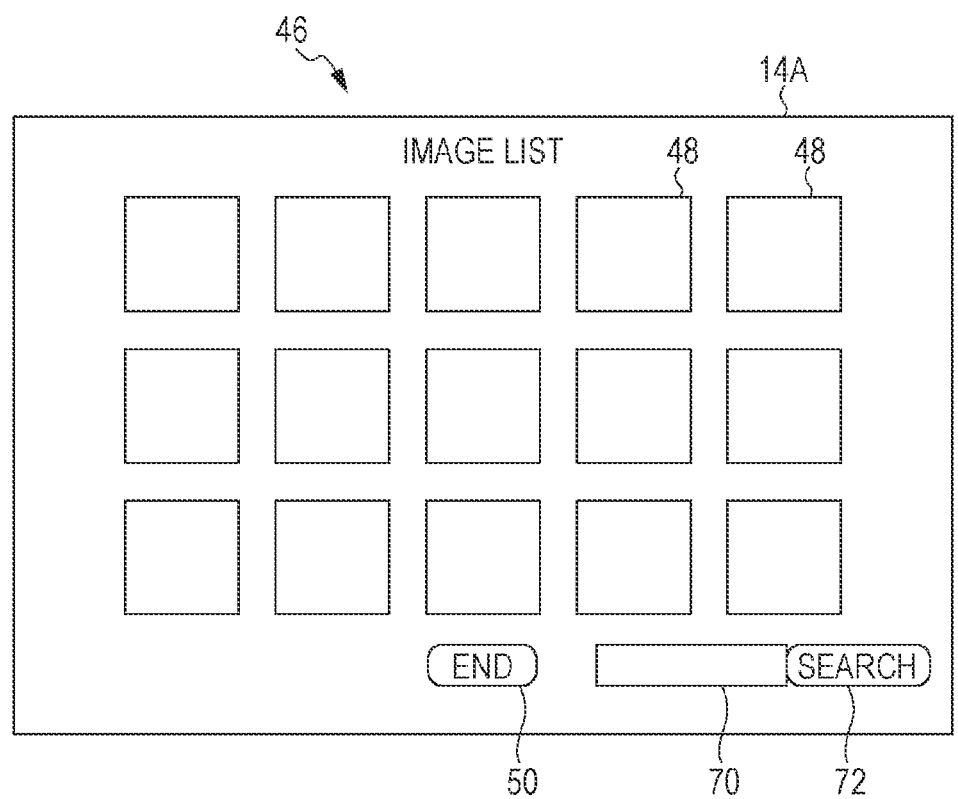

IMAGE DISPLAY CONTROL APPARATUS, IMAGE DISPLAY APPARATUS, NON-TRANSITORY COMPUTER READABLE MEDIUM, AND IMAGE DISPLAY CONTROL METHOD

CROSS-REFERENCE TO RELATED APPLICATIONS

This application is based on and claims priority under 35 USC 119 from Japanese Patent Application No. 2012-218677 filed Sep. 28, 2012.

BACKGROUND (i) Technical Field

The present invention relates to an image display control apparatus, an image display apparatus, a non-transitory computer readable medium, and an image display control method. More specifically, the present invention relates to an image display control apparatus that performs display control to display plural images each having attributes, an image display apparatus including the image display control apparatus, a non-transitory computer readable medium storing a program executed by the image display control apparatus, and an image display control method for displaying plural images each having attributes.

(ii) Related Art

Some recent image display apparatuses used in image capture apparatuses such as digital video cameras and digital electronic still cameras, mobile terminal apparatuses including such image capture apparatuses, and the like are configured to record information relevant to image information as attributes on recording media in such a manner that the attributes are attached to the image information. The attributes include, for example, information indicating the date and time of image capture, information indicating a position obtained by global positioning system (GPS), information indicating the photographer, information indicating an event set by user operation, and information indicating the format of the image information.

The attributes described above are used when, for example, images are reproduced, in order to sort the images into groups by date and time of image capture, event, or the like and reproduce the images. There is also a demand to record image information on a separate recording medium collectively in units of photographers or dates and times of image capture. To meet this demand, image display apparatuses that implement grouping for each of the attributes are nowadays being commercialized. An image display apparatus having such a grouping function is generally provided with dedicated keys, in advance, each for specifying a group, and allows a user to easily record images in units of groups or display images in units of groups by operating the dedicated keys.

Such image display apparatuses have a configuration in which a dedicated key is provided for each of the attributes. Users are thus expected to have knowledge of types of attributes corresponding to the prepared dedicated keys in order to effectively utilize the grouping function.

There may be a case where a user, when checking multiple images displayed in a list on an image display apparatus, wishes to view images relevant to some of the multiple images, such as images captured at the same date and time.

SUMMARY

According to an aspect of the invention, there is provided an image display control apparatus including a memory, a determination unit, and a display controller. The memory stores plural sets of information each set including image information indicating an image to be displayed on a display and at least one attribute concerning the image information, the image information and the at least one attribute being associated with each other. The determination unit determines, when one of plural images displayed on the display is selected, whether or not the image information stored in the memory includes image information stored in association with an attribute relevant to an attribute associated with the selected image. The display controller performs display control to, when displaying the plural images on the display in accordance with the image information stored in the memory and displaying on the display a relevant image based on image information determined by the determination unit to be included in the stored image information, display a mark for the relevant image displayed on the display, the mark indicating a relevant image that is based on image information determined by the determination unit to be included in the stored image information.

BRIEF DESCRIPTION OF THE DRAWINGS

Exemplary embodiments of the present invention will be described in detail based on the following figures, wherein:

FIG. 3 is a schematic diagram illustrating an example of attributes according to the exemplary embodiment;

FIG. 12 illustrates another example configuration of a screen displayed by the execution of the display control processing program according to the exemplary embodiment.

DETAILED DESCRIPTION

Exemplary embodiments of the present invention will be described in detail hereinafter with reference to the drawings. In the following exemplary embodiments, a smartphone will be described by way of non-limiting example. It is to be understood that the following exemplary embodiments may also apply to any other device having a display screen, such as a mobile phone, a personal digital assistant (PDA), or a portable game console.

First Exemplary Embodiment

Figure 1:
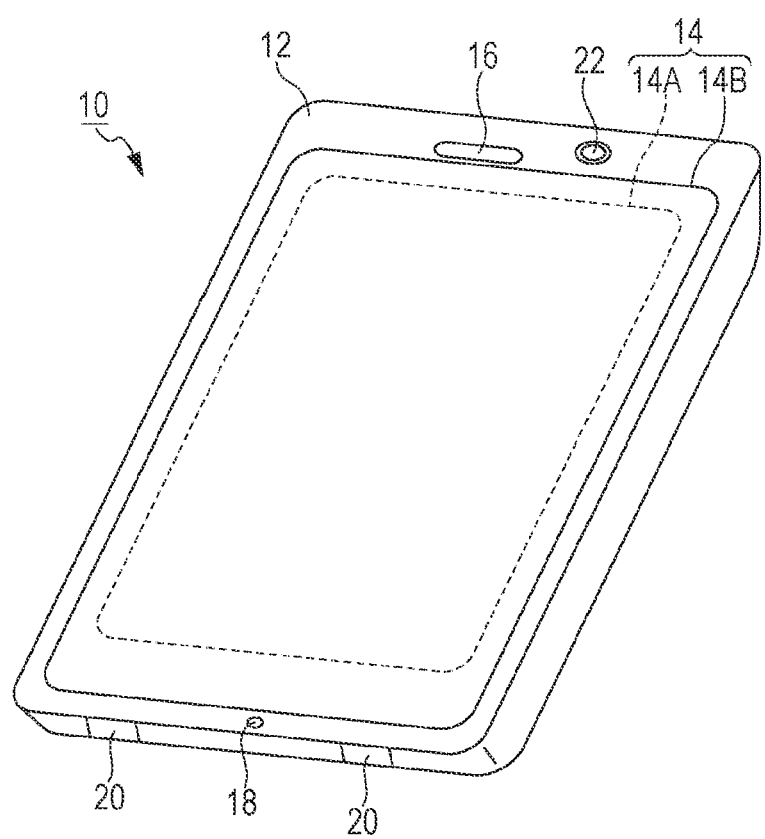
FIG. 1 is a perspective view illustrating the external appearance of a smartphone according to an exemplary embodiment.

Referring to FIG. 1, a smartphone 10 has a flat housing 12, and includes, on a surface of the housing 12, a display input unit 14 having a display panel 14A serving as a display and an operation panel 14B serving as an input unit. The display panel 14A and the operation panel 14B are formed into a single unit. The housing 12 includes a speaker 16, a microphone 18, operation units 20, and a camera unit 22. The configuration of the housing 12 is not limited to that described above, and, for example, a folding housing or a sliding housing may also be used.

Figure 2:
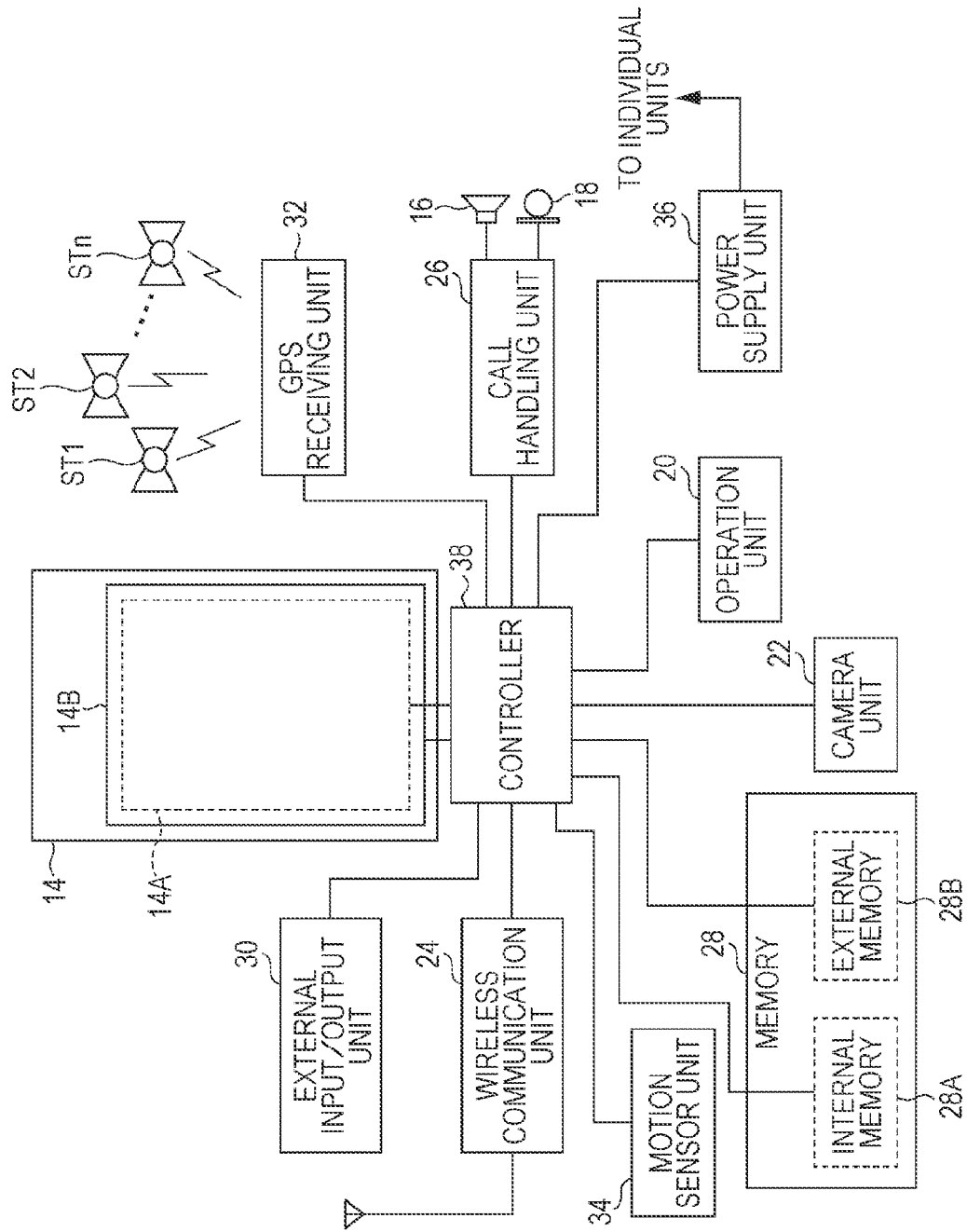
FIG. 2 is a block diagram illustrating the configuration of the smartphone according to the exemplary embodiment.

As illustrated in FIG. 2, the smartphone 10 includes a wireless communication unit 24, the display input unit 14, a call handling unit 26, the operation unit 20, the camera unit 22, a memory 28, and an external input/output unit 30. The smartphone 10 further includes a global positioning system (GPS) receiving unit 32, a motion sensor unit 34, a power supply unit 36, and a controller 38. Further, the smartphone 10 has a wireless communication function for performing mobile wireless communication via a base station device and a mobile communication network.

The wireless communication unit 24 is configured to perform wireless communication with a base station device included in a mobile communication network in accordance with an instruction of the controller 38. Using the wireless communication, the wireless communication unit 24 transmits and receives various file data such as speech data and image data, electronic mail data, and the like, and receives web data, streaming data, and so forth.

The display input unit 14 may be a touch panel display that displays images (still images and moving images), text information, and so forth to visually present information to the user and that detects a user operation on the displayed information under control of the controller 38. The display input unit 14 includes the display panel 14A and the operation panel 14B.

The display panel 14A may employ a liquid crystal display (LCD), an organic electro-luminescence display (OELD), or the like as a display apparatus. The operation panel 14B is a device disposed to allow the user to visually recognize an image displayed on a display surface of the display panel 14A and configured to detect the coordinates of one or more operations made by user's finger or touch pen. When this device is operated with a user's fingertip or touch pen, a detection signal generated in accordance with the operation is output to the controller 38. The controller 38 then detects the position (coordinates) of the operation on the display panel 14A in accordance with the received detection signal.

The size of the display area may or may not exactly coincide with the size of the display panel 14A. Examples of the position detection method employed for the operation panel 14B may include a matrix switch method, a resistive method, a surface acoustic wave method, an infrared method, an electromagnetic induction method, and an electrostatic capacitive method, and any of them may be used.

The call handling unit 26 includes the speaker 16 and the microphone 18, and is configured to convert user speech input through the microphone 18 into speech data processible by the controller 38 and output the speech data to the controller 38, or decode speech data received by the wireless communication unit 24 or the external input/output unit 30 and output the decoded speech data from the speaker 16. For example, the speaker 16 may be disposed on the same surface as the surface on which the display input unit 14 is disposed in the manner illustrated in FIG. 1, and the microphone 18 may be disposed on a side surface of the housing 12.

The operation units 20 are configured to receive an instruction given by the user. For example, as illustrated in FIG. 1, the operation units 20 may push-button switches disposed on a side surface of the housing 12 of the smartphone 10 and turned on when pressed by finger or the like and turned off, when released, due to the restoring force of a spring or the like.

The memory 28 is configured to store control programs and control data of the controller 38, application software, address data including the name, telephone number, and so forth of the communication partner which are associated with one another, data of transmitted and received electronic mails, web data downloaded by web browsing, and downloaded content data and also temporarily store streaming data and the like. The memory 28 includes a built-in internal memory 28A of the smartphone 10 and a detachable external memory 28B having an external memory slot. Each of the internal memory 28A and the external memory 28B of the memory 28 may be implemented using any type of suitable storage medium including a flash memory type, a hard disk type, a multimedia card micro type, a memory card type (such as MicroSD (registered trademark) memory), a random access memory (RAM), and a read only memory (ROM).

The external input/output unit 30 serves as an interface with all the external devices connected to the smartphone 10, and is used for direct or indirect connection with other external devices via communication (e.g., universal serial bus (USB) or Institute of Electrical and Electronics Engineers (IEEE) 1394 communication) or a network (e.g., the Internet, wireless local area network (LAN), Bluetooth (registered trademark), radio frequency identification (RFID), infrared data association (IrDA) (registered trademark), ultra wideband (UWB) (registered trademark), or ZigBee (registered trademark)).

Examples of the external devices connected to the smartphone 10 include a wired/wireless headset, a wired/wireless external charger, a wired/wireless data port, a card connected through a card socket, such as a memory card, a subscriber identity module (SIM) card, or a user identity module (UIM) card, an external audio/video device connected through an audio/video input/output (I/O) terminal, an external audio/video device connected by a wireless link, a smartphone connected to a wired/wireless network, a personal computer connected to a wired/wireless network, a PDA connected to a wired/wireless network, and an earphone. The external input/output unit 30 may transmit data received from the external devices to the internal components of the smartphone 10 and transmit internal data of the smartphone 10 to the external devices.

The GPS receiving unit 32 receives GPS signals transmitted from GPS satellites ST1 to STn, and executes a position measurement calculation process based on the received plural GPS signals to detect the position (in latitude, longitude, and altitude) of the smartphone 10 in accordance with an instruction of the controller 38. If the GPS receiving unit 32 is allowed to acquire position information from the wireless communication unit 24 or the external input/output unit 30 (e.g., a wireless LAN), the GPS receiving unit 32 may detect the position of the smartphone 10 using the acquired position information.

The motion sensor unit 34 includes, for example, a three-axis acceleration sensor and so forth, and is configured to detect a physical movement of the smartphone 10 in accordance with an instruction of the controller 38. By detecting a physical movement of the smartphone 10, the motion sensor unit 34 may detect the movement direction and acceleration of the smartphone 10. The detection results are output to the controller 38.

The power supply unit 36 is configured to supply power stored in a battery (not illustrated) to the individual components of the smartphone 10 in accordance with an instruction of the controller 38.

The controller 38 includes a microprocessor, and is configured to operate in accordance with the control programs and control data stored in the memory 28 to collectively control the individual components of the smartphone 10. Further, the controller 38 has a mobile communication control function for controlling the individual units of a communication system and an application processing function in order to perform speech communication and data communication via the wireless communication unit 24.

The application processing function may be implemented by the operation of the controller 38 in accordance with the application software stored in the memory 28. Examples of the application processing function include an infrared communication function for controlling the external input/output unit 30 to perform data communication with a counterpart device, an electronic mail function for transmitting and receiving electronic mails, and a web browsing function for viewing web pages.

The controller 38 also has an image processing function for, for example, displaying video on the display input unit 14 based on image data (still image data or moving image data) such as received data or downloaded streaming data. The image processing function is a function in which the controller 38 decodes the image data and performs image processing on the decoded image data to display an image on the display input unit 14.

Further, the controller 38 executes display control for the display panel 14A and operation detection control for detecting a user operation through the operation units 20 and the operation panel 14B.

By executing the display control, the controller 38 displays an operation unit implemented in software, such as an icon to start the application software or a scroll bar, or displays a window for creating an electronic mail. The scroll bar is an operation unit implemented in software for receiving an instruction to move a displayed part of an image which is too large to be accommodated in the display area of the display panel 14A.

By executing the operation detection control, the controller 38 detects user operations made through the operation units 20, receives an operation on the icon described above or an input of a character string to an input field on the window described above through the operation panel 14B, or receives a request for scrolling a displayed image with the scroll bar.

By executing the operation detection control, furthermore, the controller 38 determines whether the position at which the operation panel 14B was operated is located in a superimposition part (display area) that overlaps the display panel 14A or in a non-superimposition, outer peripheral part (non-display area) that does not overlap the display panel 14A. The controller 38 has a touch panel control function for controlling a touch-sensitive area of the operation panel 14B and the displayed position of the operation unit implemented in software.

The controller 38 may also detect a gesture made to the operation panel 14B, and implement a preset function in accordance with the detected gesture. A gesture is not an existing simple touch but a more complex action such as rendering a trail of a finger or the like across the operation panel 14B, simultaneously specifying plural positions on the operation panel 14B, or a combination thereof to render a trail of the finger or the like regarding at least one of the plural positions.

The camera unit 22 may be a digital camera configured to electronically capture an image using an imaging element such as a complementary metal oxide semiconductor (CMOS) or charge-coupled device (CCD) sensor. The camera unit 22 is also configured to convert image data obtained by image capture into compressed image data such as JPEG (Joint Photographic Experts Group) image data under control of the controller 38, and record the resulting image data in the memory 28 or output the resulting image data through the external input/output unit 30 or the wireless communication unit 24. In the smartphone 10 illustrated in FIG. 1, the camera unit 22 is disposed on the same surface as the surface on which the display input unit 14 is disposed. Instead, the camera unit 22 may be disposed on the rear surface of the display input unit 14, or, alternatively, multiple camera units 22 may be disposed. If multiple camera units 22 are disposed, the camera units 22 may be used independently by switching from one to another to capture images, or the multiple camera units 22 may be used simultaneously to capture images.

The camera unit 22 may also be used for various functions of the smartphone 10. For example, an image captured with the camera unit 22 may be displayed on the display panel 14A, or an image obtained by the camera unit 22 may be used as an operation input tool of the operation panel 14B. Further, the GPS receiving unit 32 may refer to an image obtained by the camera unit 22 to detect a position. In addition, the optical axis direction of the camera unit 22 of the smartphone 10 may be determined or current use conditions may be determined by referring to an image obtained by the camera unit 22, without using the three-axis acceleration sensor or along with the three-axis acceleration sensor. An image obtained by the camera unit 22 may also be used in the application software.

Additionally, position information acquired by the GPS receiving unit 32, speech information (which may be subjected to speech-to-text conversion to obtain text information by using the controller 38 or the like) acquired by the microphone 18, attitude information acquired by the motion sensor unit 34, and any other desired information may be added to image data of a still image or a moving image, and the image data having such information may be recorded on the memory 28 or output through the external input/output unit 30 or the wireless communication unit 24.

In the smartphone 10 according to this exemplary embodiment, at least one of the internal memory 28A and the external memory 28B stores image information. When an instruction for displaying the image information in a list is given by user operation, the smartphone 10 performs control to display the list on the display panel 14A.

In a case where plural digitized files (hereinafter also referred to simply as "files") including the image information described above are stored in the memory 28, the smartphone 10 stores attributes associated with each of the files.

As illustrated in FIG. 3, attributes 40 include file name information 40a indicating file name, and classification label information 40b indicating the type of camera and lens used for image capture when the file is an image file obtained by image capture. The attributes 40 further include photographer/creator information 40c indicating the creator of the file (or the photographer if the file is an image file obtained by image capture). The attributes 40 further include image capture location information 40d indicating the location at which the file was captured when the file is an image file obtained by image capture. The attributes 40 further include image capture date/creation date information 40e indicating the date at which the file was created (or the date of image capture when the file is an image file obtained by image capture). The attributes 40 further include relevant information 40f that is information relevant to the file, and storage location information 40g indicating the storage location of the file. The relevant information 40f may be information added when the file is created, or may be information input by user operation at a desired time. The information to be associated as the attributes 40 is not limited to that described above, and may include attitude information acquired by the motion sensor unit 34 or the like. Plural pieces of the information described above may be used in combination.

The smartphone 10 is further configured to display files stored in the memory 28 and images of icons of the application programs on the display panel 14A in a list in accordance with a user operation. The smartphone 10 may also be configured to display image files representing plural images among the files, which are obtained by image capture and the like, in a list in such a manner that the images represented by the image files are substantially uniformly enlarged or reduced in size.

The user sometimes wishes to check, when viewing the images displayed in the list on the display panel 14A, whether or not the images displayed in the list include an image relevant to a given one of the displayed images, and further check which image is the relevant image if the relevant image is included.

To fulfill the wish, the smartphone 10 according to this exemplary embodiment receives a selection instruction for selecting one of the plural images displayed on the display panel 14A. Further, the smartphone 10 determines whether or not an image associated with attributes 40 relevant to the attributes 40 associated with the image for which the selection instruction has been received is included in the plural images. If it is determined that the image is included, the smartphone 10 causes presence information such as a marking capable of identifying the image to be displayed on the display panel 14A.

Figure 4:
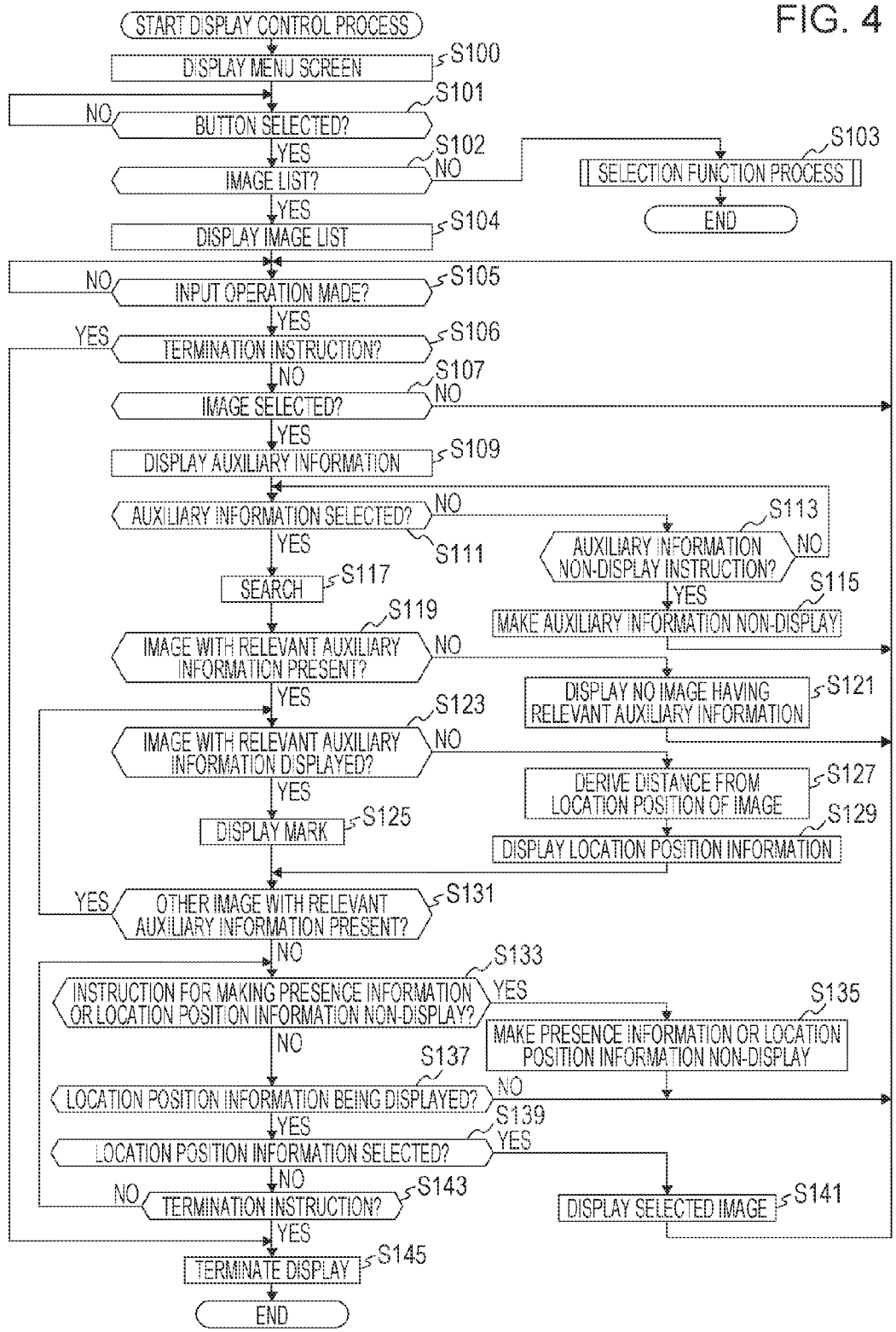
FIG. 4 is a flowchart illustrating a processing procedure of a display control processing program according to a first exemplary embodiment.

The operation of the smartphone 10 according to this exemplary embodiment will be described with reference to FIG. 4. FIG. 4 is a flowchart illustrating a process of a display control processing program executed by the controller 38 of the smartphone 10 when an execution instruction is input through the operation panel 14B or the operation unit 20. The program is stored in advance in a certain area of the internal memory 28A.

In step S100, the controller 38 performs control to display on the display panel 14A a menu screen 42 from which a screen transition occurs.

Figure 5A:
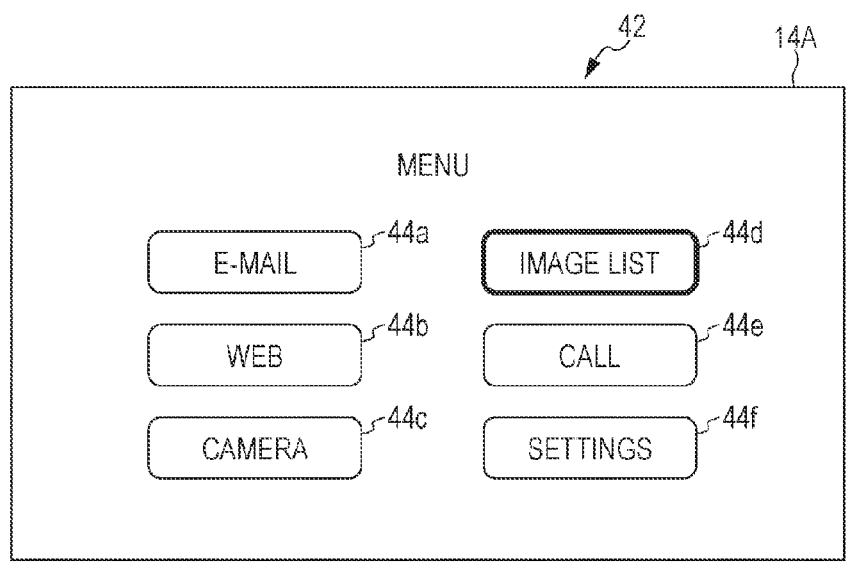
FIGS. 5A and 5B illustrate example configurations of a screen displayed by the execution of a display control processing program according to an exemplary embodiment.

FIG. 5A illustrates an example of the menu screen 42 according to this exemplary embodiment. As illustrated in FIG. 5A, the menu screen 42 has menu buttons. The menu buttons include, for example, an "e-mail" button 44a used to instruct start of the e-mail function, a "web" button 44b used to instruct start of the web browsing function, a "camera" button 44c used to instruct start of the camera function, an "image list" button 44d used to instruct start of the image list function, a "call" button 44e used to instruct start of the function of making a call, and a "settings" button 44f used to instruct start of various setting functions.

The user touches a desired one of the menu buttons on the menu screen 42 to select the associated menu item. Accordingly, the controller 38 starts the function corresponding to the selected menu button.

In step 101, the process waits for the user to select a menu button. Then, in step 102, the controller 38 determines whether the menu button selected by the user is the "image list" button 44d or not. If NO is selected, the process proceeds to step S103. In step S103, the controller 38 executes the function corresponding to the selected menu button, and then terminates the program. If YES is selected, the process proceeds to step S104.

In step S104, the controller 38 performs control to display on the display panel 14A a list view screen in which the plural images stored in the memory 28 are displayed in a list.

Figure 5B:
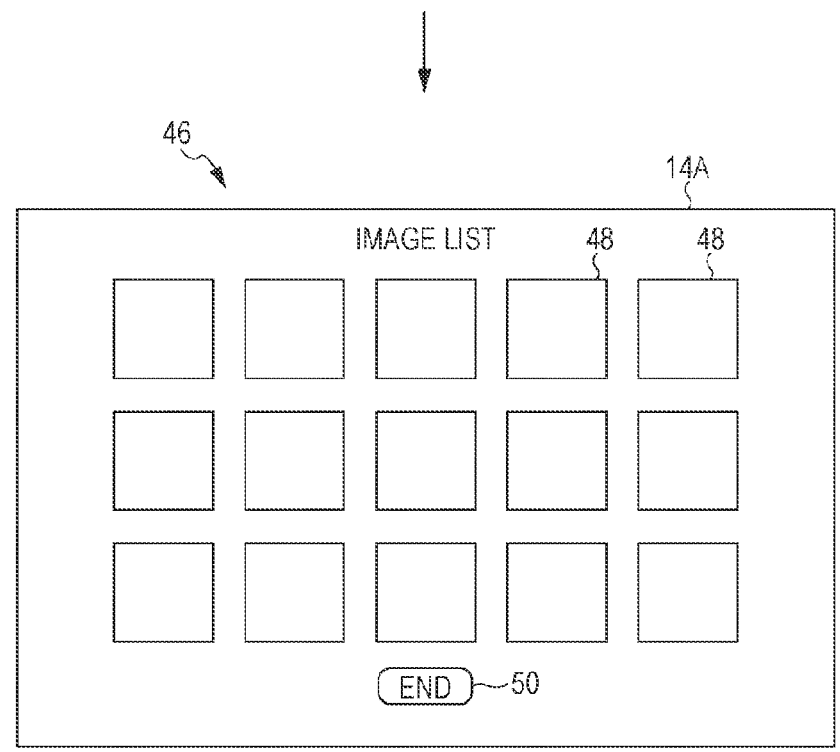

FIG. 5B illustrates an example of an image list screen 46 according to this exemplary embodiment. As illustrated in FIG. 5B, the image list screen 46 shows plural images 48 arranged in a matrix, and an "End" button 50 which is touched to terminate the display control processing program. The plural images 48 are images indicated by the pieces of image information stored in the memory 28.

In step S105, the controller 38 determines whether or not an input operation has been made through the operation panel 14B.

If it is determined in step S105 that an input operation has been made, the process proceeds to step S106. In step S106, the controller 38 determines whether the touched button is the "End" button 50 or not to determine whether or not the input operation is an operation of inputting an instruction to terminate the display control processing program.

If it is determined in step S106 that the input operation is not an operation of inputting an instruction to terminate the display control processing program, the process proceeds to step S107. In step S107, the controller 38 determines whether or not the input operation is an input operation for selecting an image. If it is determined in step S107 that the input operation is not an input operation for selecting an image, the process returns to step S105.

If it is determined in step S107 that the input operation is an input operation for selecting an image, the process proceeds to step S109. In step S109, the controller 38 acquires the attributes 40 associated with the selected image from the memory 28, and performs control to display the acquired attributes 40 on the display panel 14A. This allows the user to check the attributes 40 associated with the selected image.

Figure 6A:
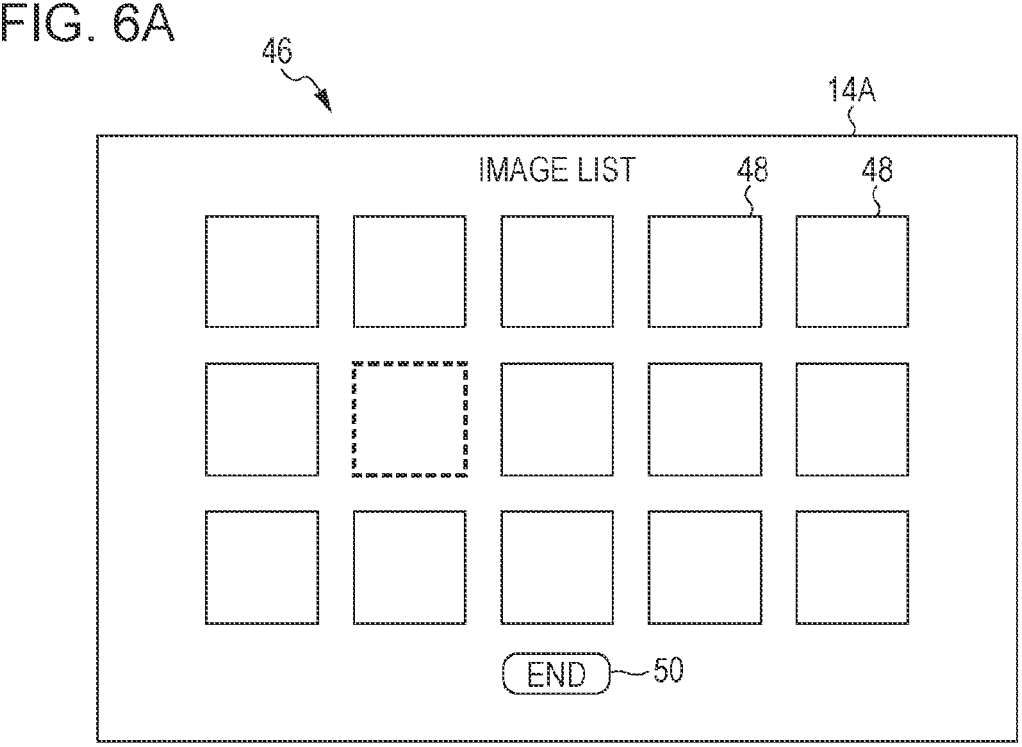
FIGS. 6A and 6B illustrate example configurations of a screen displayed by the execution of the display control processing program according to the exemplary embodiment.
Figure 6B:
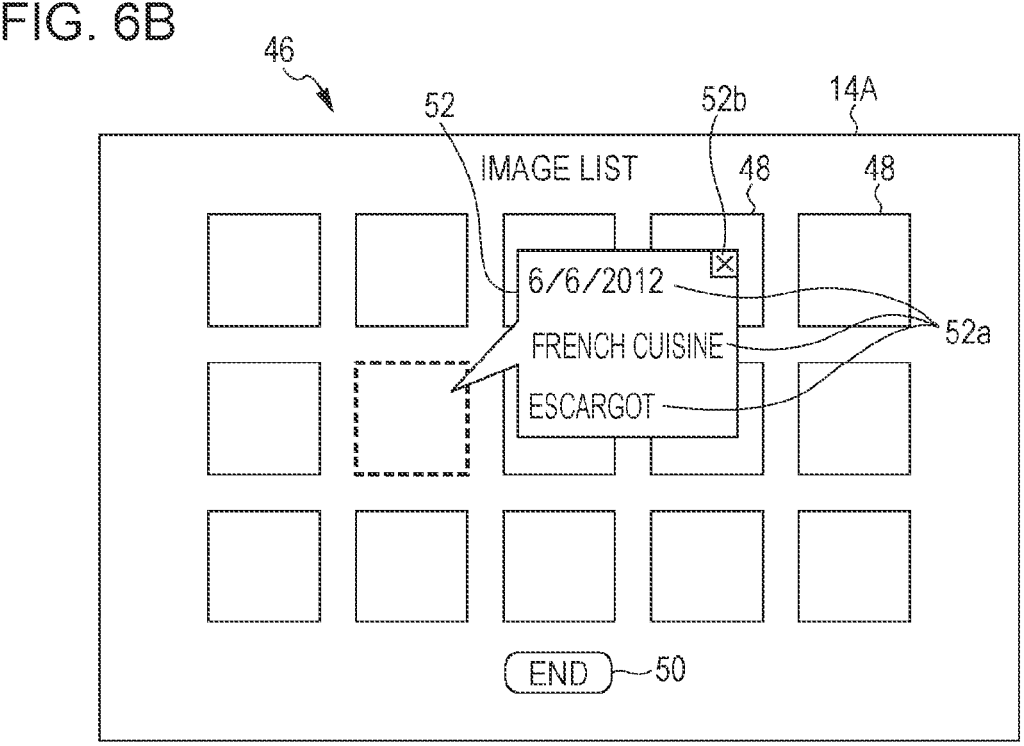

As illustrated in FIG. 6A, it is assumed that one of the plural images 48 displayed on the image list screen 46 which is surrounded by a broken line (for example, "fig1" illustrated in FIG. 3) is selected. In this case, as illustrated in FIG. 6B, an attribute display part 52 that shows the attributes 40 associated with the selected image 48 is displayed on the image list screen 46. The attribute display part 52 includes items 52a associated with the image of "fig1", such as the image capture date/creation date information 40e, namely, "Jun. 6, 2012", and the relevant information 40f, namely, "French cuisine" and "escargot". The attribute display part 52 also includes an attribute non-display button 52b to issue an instruction to terminate the display of the attribute display part 52.

In step S111, the controller 38 determines whether one of the items 52a of the attributes 40 displayed in step S109 has been selected or not.

If it is determined in step S111 that none of the items 52a has been selected, the process proceeds to step S113. In step S113, the controller 38 determines whether the touched button is the attribute non-display button 52b or not to determine whether an instruction for making the attributes 40 non-display has been issued.

If it is determined in step S113 that an instruction for making the attributes 40 non-display has been issued, the process proceeds to step S115. In step S115, the controller 38 performs control to terminate the display of the attribute display part 52 to make the attributes 40 non-display. Then, the process returns to step S105. In this case, only the image list screen 46 illustrated in FIG. 5B is displayed on the display panel 14A.

If it is determined in step S111 that one of the items 52a has been selected, the process proceeds to step S117. In step S117, the controller 38 searches for image information (hereinafter referred to as "associated image information") associated with the attributes 40 relevant to the selected item 52a from the image information on the plural images stored in the memory 28.

In step S119, the controller 38 determines whether the associated image information concerning the selected item 52a is present or not as a result of the search in step S117. Each attribute relevant to the selected item 52a may be an attribute having the same item as the selected item 52a or may be a similar attribute. The similar attribute is an attribute for which the date contained in the image capture date/creation date information 40e is within a predetermined period in which the selected item 52a is also included, an attribute for which the location of image capture indicated by the image capture location information 40d is within predetermined area in which the selected item 52a is also included, or the like. The similar attribute may also be an attribute including, if the attribute has plural pieces of relevant information 40f, some of the plural pieces of relevant information 40f which are the same as the selected item 52a. Alternatively, groups of plural attributes may be determined in advance and stored in the memory 28, and attributes in the same group may be relevant attributes.

If it is determined in step S119 that the associated image information is not present, the process proceeds to step S121. In step S121, the controller 38 performs control to display a report indicating the absence of the associated image information on the display panel 14A.

Figure 7A:
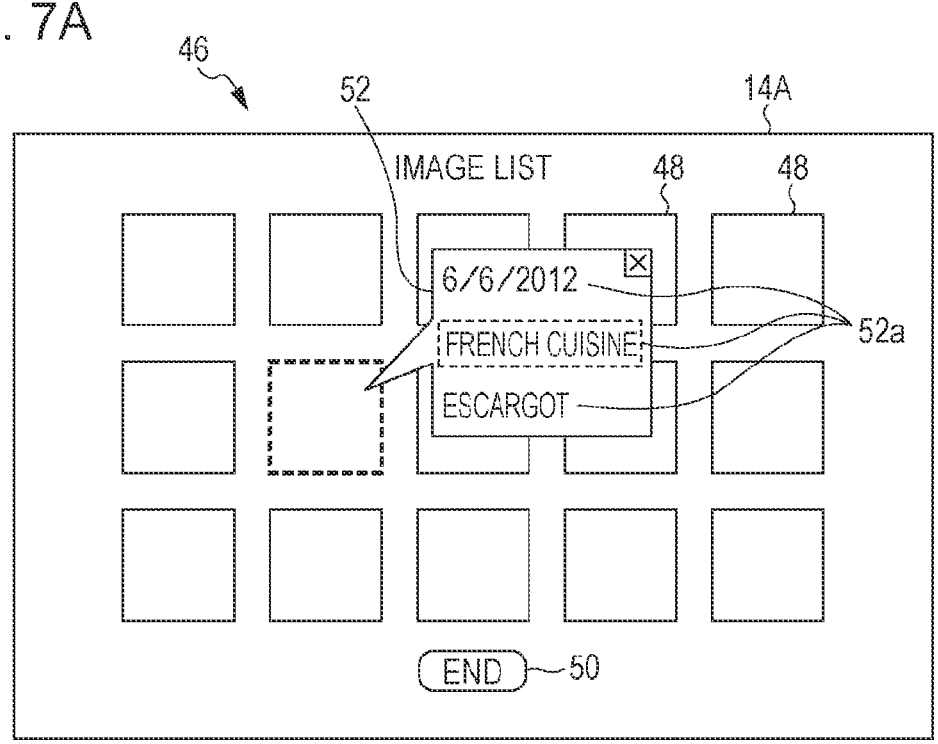
FIGS. 7A and 7B illustrate example configurations of a screen displayed by the execution of the display control processing program according to the exemplary embodiment.
Figure 7B:
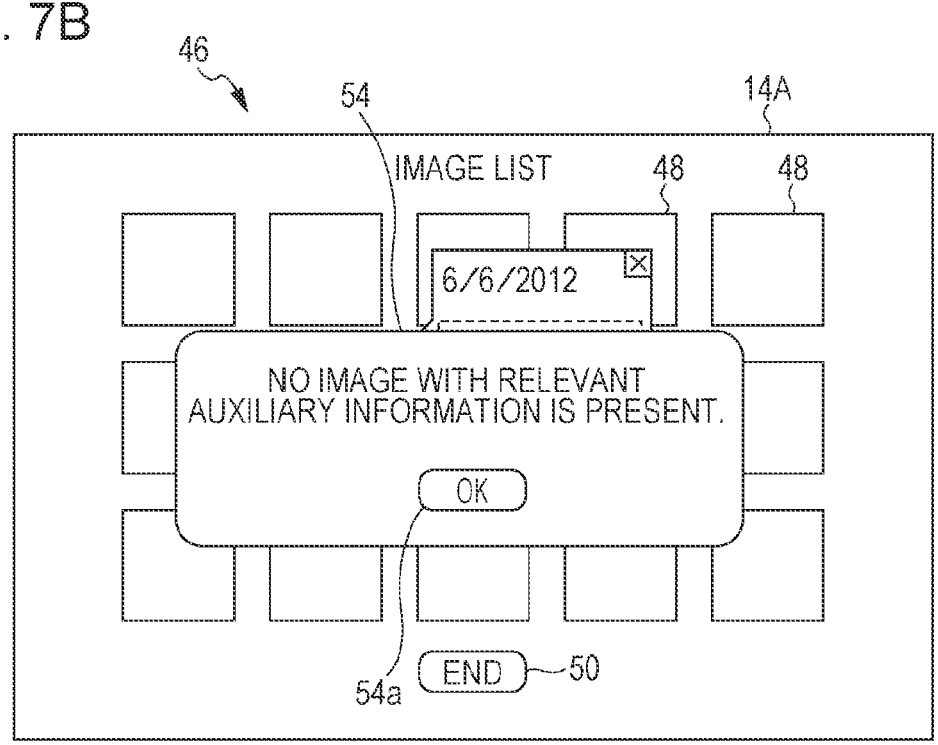

As illustrated in FIG. 7A, for example, one of the items 52a, "French cuisine", is selected, and there is no image information associated with the attributes 40 relevant to the item "French cuisine". In this case, as illustrated in FIG. 7B, a warning display part 54 indicating that there is no image information associated with the relevant attributes 40 is displayed so as to be superimposed on top of the image list screen 46. The warning display part 54 has an "OK" button 54a to input an acknowledgement of the warning. When the selection of the "OK" button 54a by user operation is received, the process returns to step S105.

If it is determined in step S119 that the associated image information is present, the process proceeds to step S123. In step S123, the controller 38 determines whether an image represented by the associated image information is being displayed on the display panel 14A or not.

If it is determined in step S123 that the image is being displayed, the process proceeds to step S125. In step S125, the controller 38 performs control to display a mark indicating the associated image information on the display panel 14A. The mark may be displayed as a balloon on the image represented by the associated image information as long as the mark indicates that the associated image information is present. The mark may also be an indication with markings to clearly distinguish the image represented by the associated image information from the other images. Such a mark may allow the user to easily check which image is the relevant image.

Figure 8A:
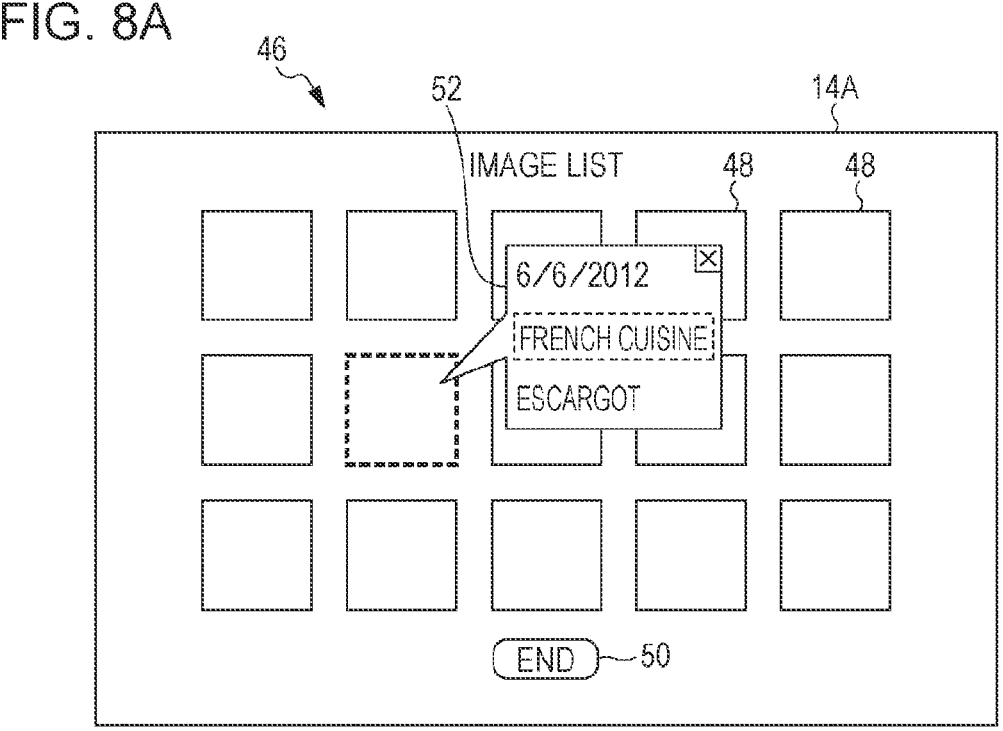
FIGS. 8A and 8B illustrate example configurations of a screen displayed by the execution of the display control processing program according to the exemplary embodiment.
Figure 8B:
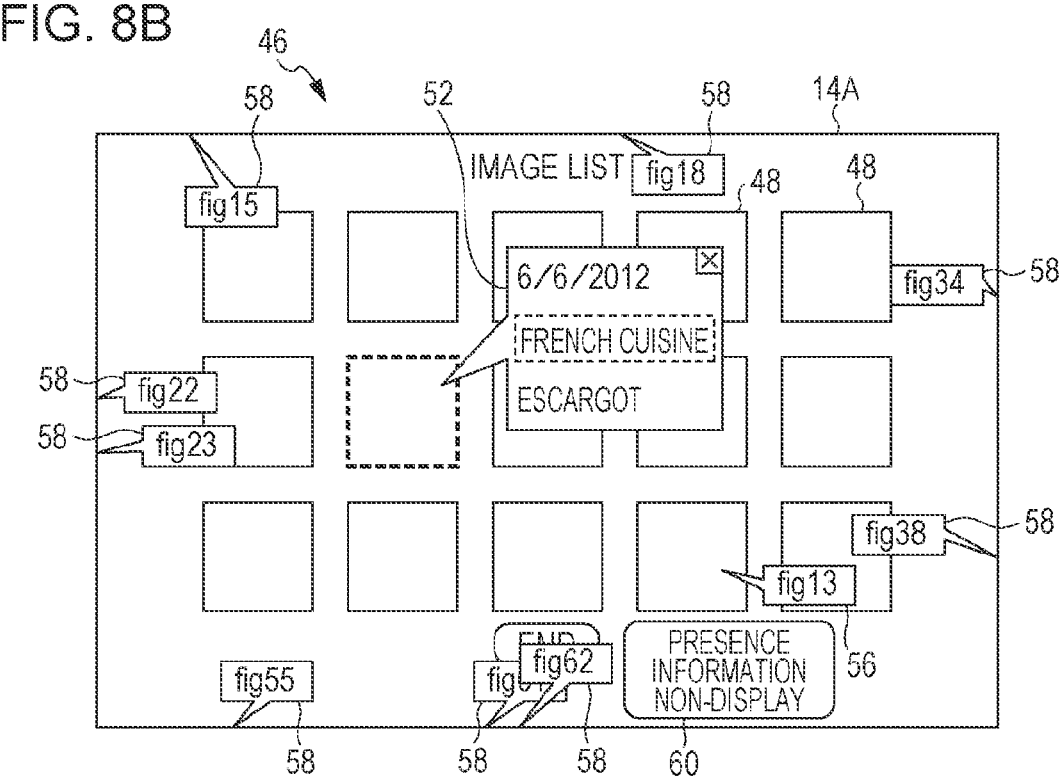

As illustrated in FIG. 8A, for example, the item "French cuisine" is selected as an item 52a, and an image represented by the image information associated with the attributes 40 relevant to the item "French cuisine" is displayed. In this case, as illustrated in FIG. 8B, for example, a balloon 56 in which the file name information 40a is displayed appears on the image list screen 46 in association with the image represented by the associated image information. Further, a presence information non-display button 60 for instructing termination of display of the mark or position information described below is displayed on the image list screen 46.

If it is determined in step S123 that the image represented by the associated image information is not being displayed, the process proceeds to step S127. In step S127, the controller 38 derives the distance from the location position of the image represented by the associated image information to the area of the position information displayed in the display panel 14A. The term "location position", as used herein, refers to a location position on the image list screen 46 including an area displayed by scrolling the display area of the display panel 14A.

In step S129, the controller 38 performs control to display position information indicating the location position of the associated image information on the display panel 14A. This allows the user to make sure that there is a relevant image which is not displayed on the display panel 14A.

As illustrated in FIG. 8A, for example, the item "French cuisine" is selected as an item 52a, and there is image information that is associated with the attributes 40 relevant to the item "French cuisine" and that is not being displayed. In this case, as illustrated in FIG. 8B, for example, balloons 58 in which the file name information 40a is displayed appear. The controller 38 derives the positions having the shortest distance from the location positions of the images represented by the associated image information to the display area. Then, the controller 38 performs control to display the balloons 58 with leader lines having lengths corresponding to the distances derived in step S127 are displayed on the display panel 14A at the derived positions.

Figure 9:
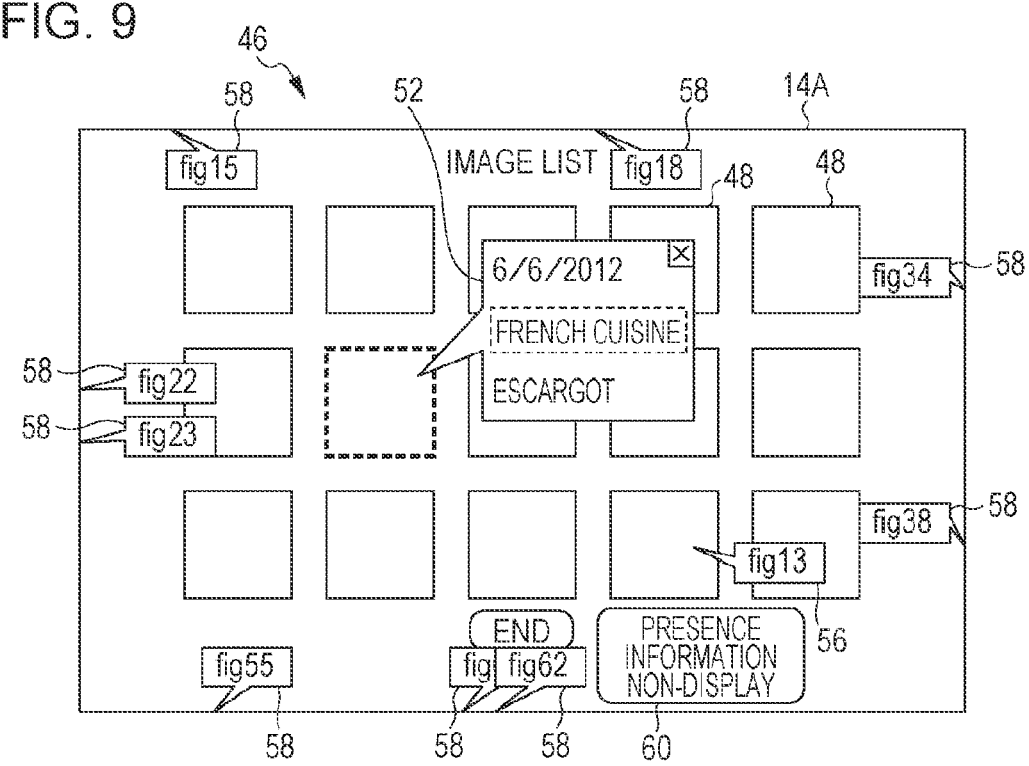
FIG. 9 illustrates an example configuration of a screen displayed by the execution of the display control processing program according to the exemplary embodiment.
Figure 10:
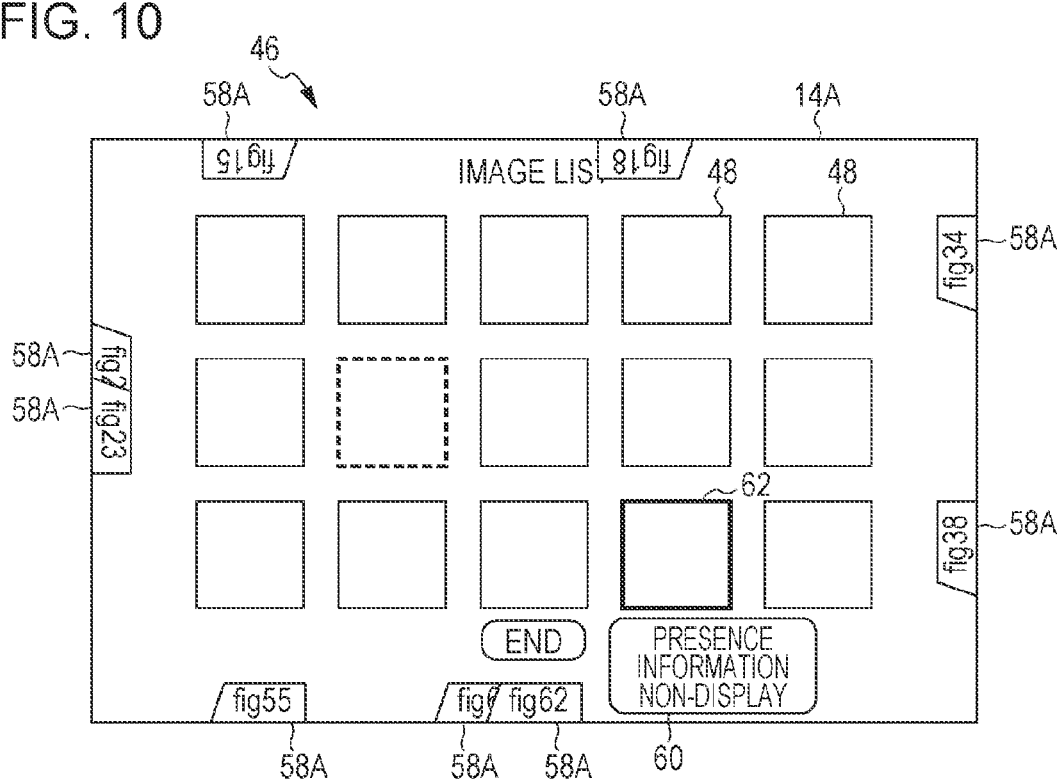
FIG. 10 illustrates an example configuration of a screen displayed by the execution of the display control processing program according to the exemplary embodiment.

FIGS. 9 and 10 illustrate another example of the image list screen 46 according to this exemplary embodiment. As illustrated in FIG. 8A, for example, the item "French cuisine" is selected as an item 52a, and there is image information that is associated with the attributes 40 relevant to the item "French cuisine" and that is not being displayed. In this case, the processing of step S127 may not necessarily be performed. That is, as illustrated in FIG. 9, for example, balloons 58 in which the file name information 40a is displayed may be displayed so as to have substantially equal leader lines.

Further, as illustrated in FIG. 10, the image may be displayed with a highlight 62 surrounding the image as the mark described above without using the balloons 56 and 58 on the image list screen 46, or, for example, tags 58A in which the file names are displayed may be displayed as position information along the periphery of the image list screen 46.

After a mark is displayed step S125 or after position information is displayed in step S129, the process proceeds to step S131. In step S131, the controller 38 determines whether or not any other associated image information is present.

If it is determined in step S131 that any other associated image information is present, the process returns to step S123. If it is determined in step S131 that no other associated image information is present, the process proceeds to step S133. In step S133, the controller 38 determines whether or not the touched button is the presence information non-display button 60 to determine whether or not an instruction for making the mark or position information non-display has been entered.

If it is determined in step S133 that a non-display instruction has been entered, the process proceeds to step S135. In step S135, the controller 38 performs control to, if a mark is being displayed, cease the display of the mark, and to, if position information is being displayed, cease the display of the position information. After the display of the mark or the display of the position information has been ceased, the process returns to step S105.

If it is determined in step S133 that a non-display instruction has not been entered, the process proceeds to step S137. In step S137, the controller 38 determines whether or not position information is currently being displayed on the image list screen 46. If it is determined in step S137 that position information is not currently being displayed on the image list screen 46, the process returns to step S105.

If it is determined in step S137 that position information is currently being displayed on the image list screen 46, the process proceeds to step S139. In step S139, the controller 38 determines whether or not position information has been selected. The controller 38 determines that position information has been selected if one of the balloons 58, serving as position information, which are displayed in step S129 has been selected by user operation.

If it is determined in step S139 that position information has been selected, the process proceeds to step S141. In step S141, the controller 38 performs control to display an image represented by the image information whose location position is identified by the selected position information on the display panel 14A. Then, the process proceeds to step S105.

Figure 11A:
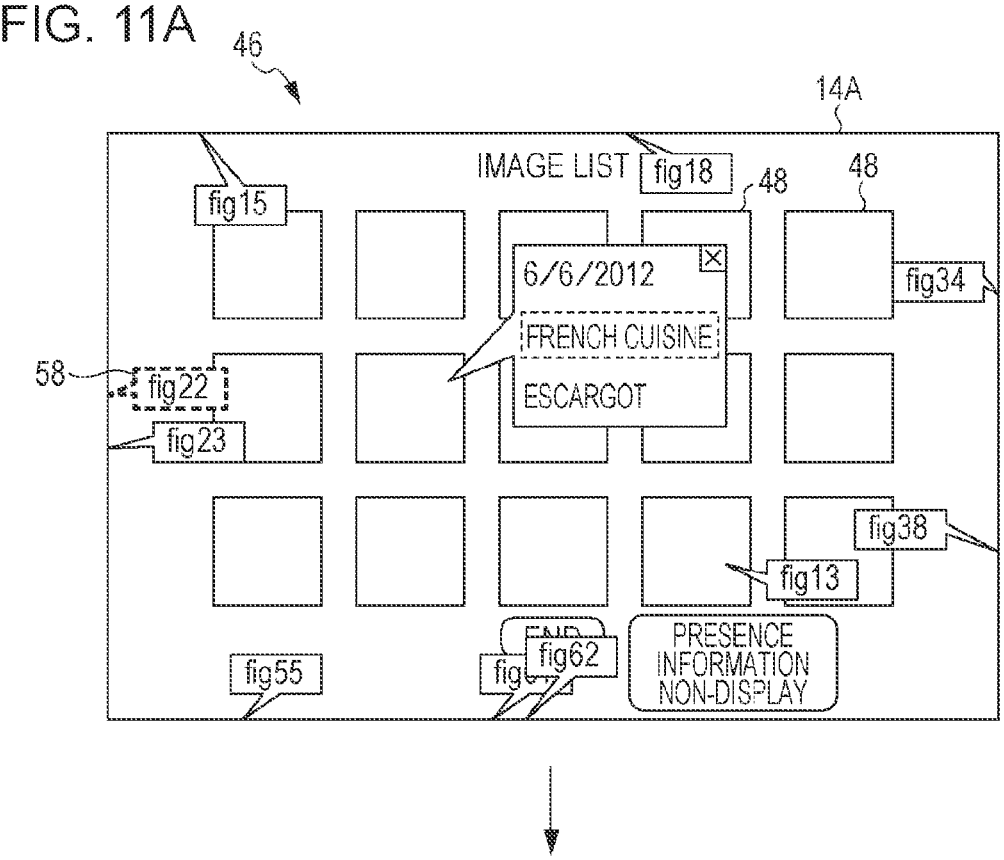
FIGS. 11A and 11B illustrate example configurations of a screen displayed by the execution of the display control processing program according to the exemplary embodiment.
Figure 11B:
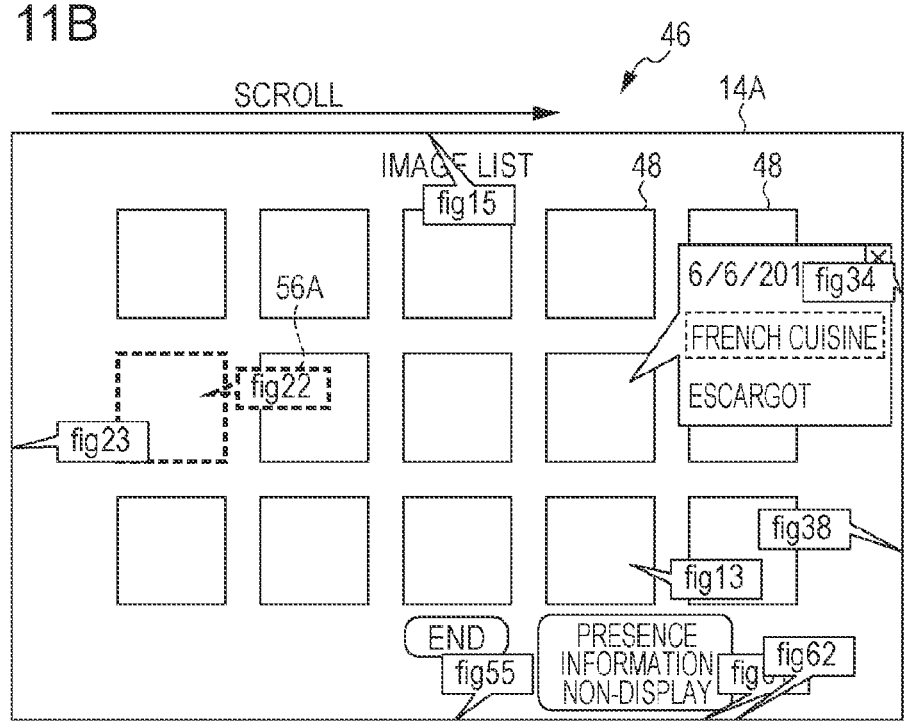

As illustrated in FIG. 11A, for example, a balloon 58 indicating the location position of image information (hereinafter referred to as "specified image information") identified by file name "fig22" is selected on the image list screen 46. In this case, as illustrated in FIG. 11B, the displayed images are scrolled to the right in front view and the scroll is stopped when the image represented by the specified image information fully appears. The balloon 58 representing the location position of the image represented by the specified image information is changed to a balloon 56A for the image and the balloon 56A is displayed as the mark at the time when the image represented by the specified image information is displayed.

If it is determined in step S139 that position information has not been selected, the process proceeds to step S143. In step S143, the controller 38 determines whether or not the touched button is the "End" button 50 to determine whether or not an operation for inputting an instruction for terminating the display control processing program has been performed.

If it is determined in step S106 or step S143 that an operation for inputting an instruction for terminating the display control processing program has been performed, the process proceeds to step S145. In step S145, the controller 38 performs control to terminate the display of the image list screen 46 on the display panel 14A, and then terminates the display control processing program.

Accordingly, the smartphone 10 according to this exemplary embodiment stores plural sets of information each set including image information indicating an image to be displayed on the display panel 14A, which serves as a display, and at least one attribute concerning the image information in such a manner that the image information and the at least one attribute are associated with each other. Further, when one of plural images displayed on the display is selected, it is determined whether or not the stored image information includes image information stored in association with an attribute relevant to an attribute associated with the selected image. Further, when plural images are displayed on the display in accordance with the stored image information and a relevant image based on image information determined to be included in the stored image information is displayed on the display, a mark indicating a relevant image is displayed for the relevant image displayed on the display.

If there are plural attributes 40 associated with the image for which the selection instruction has been received, the plural attributes 40 are displayed on the display prior to the display of presence information, and an instruction for selecting one of the plural attributes 40 is further received. Further, it is determined whether or not there is an image associated with an attribute relevant to the attribute 40 for which the selection instruction has been received.

As illustrated in FIG. 12, the image list screen 46 displayed in step S101 of the display control process may include a search term input field 70 where a search term is input, and a search button 72 for instructing a search using the search term.

While the search term input field 70 is displayed, upon detecting that a user's finger has touched the search term input field 70, the controller 38 displays a key input section (or software keyboard) having character keys on the display panel 14A and prompts the user to enter a search term using the character keys. Alternatively, upon detecting that a user's finger has touched the search term input field 70, the controller 38 may display words and phrases included in the attributes 40 stored in the memory 28 on the display panel 14A as alternatives. When alternatives are displayed, the user may select one of the alternatives to enter an appropriate word or phrase.

The user enters a search term in the search term input field 70 through the operation panel 14B, and selects the search button 72. Upon detecting that a user's finger has touched the search button 72, the controller 38 performs a search using the search term entered in the search term input field 70 in a manner similar to that of the processing of step S117. Further, the controller 38 performs the processing of steps S119 to S143 after performing the processing of step 117. This allows the user to easily recognize the presence of an image relevant to an image displayed on the display panel 14A as well as the presence of an image relevant to a search term entered by the user.

Second Exemplary Embodiment

Next, a smartphone 10 according to a second exemplary embodiment will be described.

Like the smartphone 10 according to the first exemplary embodiment, the smartphone 10 according to the second exemplary embodiment has the configuration illustrated in FIGS. 1 and 2.

The smartphone 10 according to the first exemplary embodiment displays attributes 40 and searches for image information based on the attributes 40. In contrast, the smartphone 10 according to the second exemplary embodiment searches for image information based on attributes 40 without displaying the attributes 40.

Figure 13:
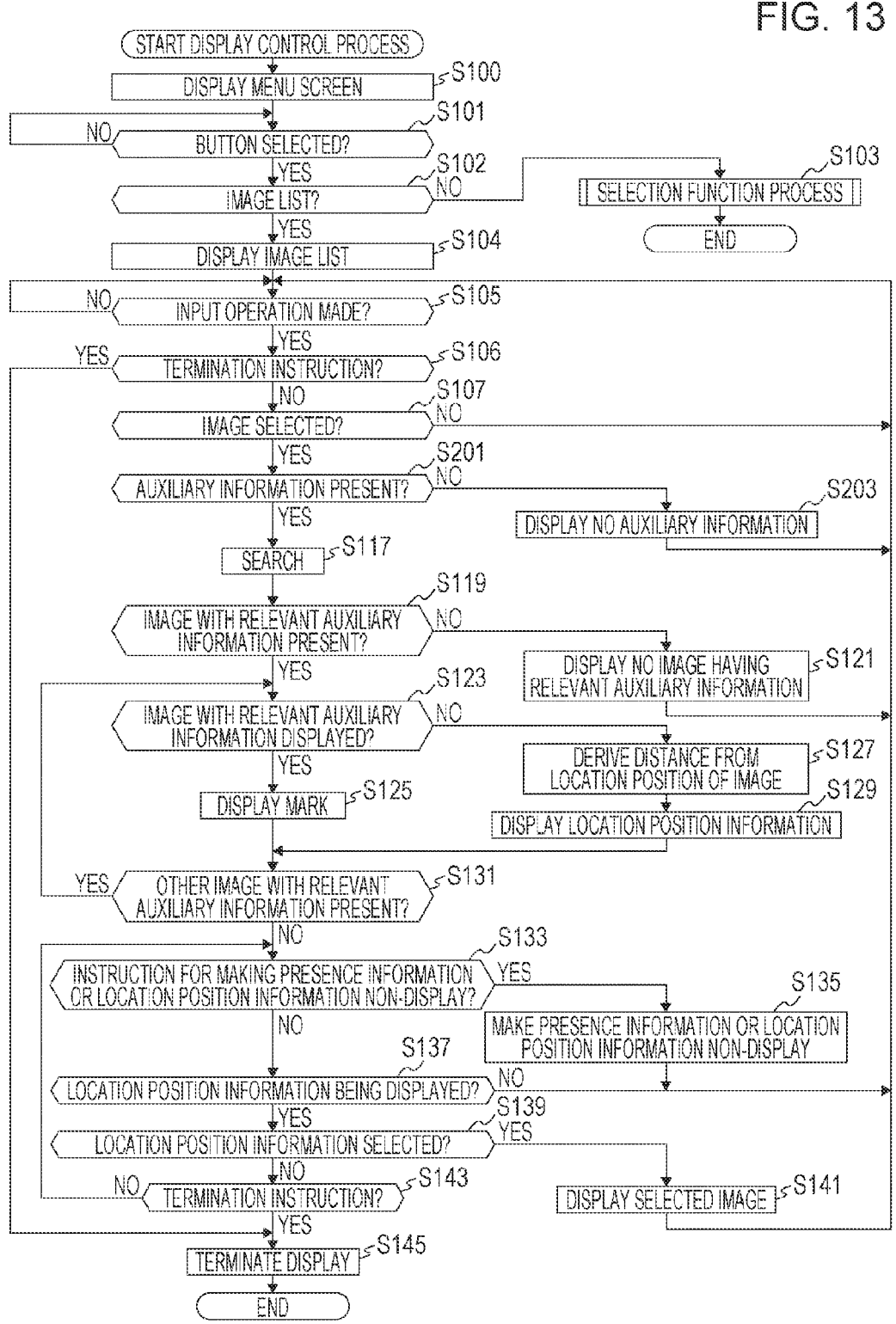
FIG. 13 is a flowchart illustrating a processing procedure of a display control processing program according to a second exemplary embodiment.

The operation of the smartphone 10 according to this exemplary embodiment will now be described with reference to FIG. 13. FIG. 13 is a flowchart illustrating a processing procedure of a display control processing program according to the second exemplary embodiment, which is executed by the controller 38 of the smartphone 10 when an execution instruction is input through the operation panel 14B or the operation unit 20. The program is stored in advance in a certain area of the internal memory 28A.

In FIG. 13, steps of performing processing substantially the same as that in FIG. 4 are assigned the same step numbers as those in FIG. 4, and a description thereof is omitted.

First, in steps S100 to S107, processing similar to that in steps S100 to S107 according to the first exemplary embodiment is performed.

If it is determined in step S107 that an image has been selected, the process proceeds to step S201. In step S201, the controller 38 determines whether or not there is an attribute 40 associated with the selected image.

If it is determined in step S201 that there are no attributes 40 associated with the selected image, the process proceeds to step S203. In step S203, the controller 38 performs control to display a report indicating that no attributes 40 are associated with the selected image on the display panel 14A. Then, the process returns to step S105. In this case, a report indicating that no attributes 40 are associated with the selected image may be displayed using a method similar to that in step S121 described above.

If it is determined in step S201 that there is an attribute 40 associated with the selected image, in steps S117 to S145, processing similar to that of steps S117 to S145 according to the first exemplary embodiment is performed.

Accordingly, the smartphone 10 according to this exemplary embodiment receives an instruction for selecting one of plural images displayed on the display panel 14A, which serves as a display. Further, it is determined whether or not there is an image associated with an attribute relevant to an attribute 40 associated with an image for which a selection instruction has been received. If it is determined that such an image is present, presence information indicating the presence of an image is displayed using a display. This allows a user to easily recognize the presence of an image relevant to a currently displayed image.

In this exemplary embodiment, when one of plural images displayed on the display panel 14A is selected, an image accompanying attributes relevant to the attributes 40 attached to the selected image is searched for, which is non-limiting.

While the foregoing exemplary embodiments are implemented by software executed by a computer program, the present invention is not limited to these exemplary embodiments. It is to be understood that some exemplary embodiments of the present invention may be implemented only by hardware or by a combination of hardware and software.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image display control apparatus comprising:
    a memory configured to store a plurality of sets of information each set including image information indicating an image to be displayed on a display and at least one attribute concerning the image information, the image information and the at least one attribute being associated with each other;
    a determination unit configured to determine, in response to one of a plurality of images displayed on the display being selected, whether or not any image information stored in the memory indicates a relevant image that is associated with an attribute relevant to an attribute associated with the selected image; and
    a display controller configured to perform display control to display a mark indicating each individual relevant image on the display, without grouping image information, in response to displaying the relevant image determined by the determination unit on the display,
    wherein in response to no portion of the relevant image being displayed on the display, the display controller is configured to perform display control to display position information indicating a location position of the relevant image on the display, and
    in response to the relevant image not being displayed on the display, the display controller is configured to perform display control to display position information indicating a location position of the relevant image on the display, together with information indicating a distance from a position at which the position information is displayed to the location position of the relevant image.

2. The image display control apparatus according to claim 1, wherein
    in response to a plurality of attributes being stored in association with the selected image, the display controller causes the plurality of attributes to be displayed on the display, and
    the determination unit is configured to use an attribute selected from among the displayed plurality of attributes as the attribute corresponding to the selected image, and determine whether or not the image information stored in the memory includes image information stored in association with an attribute relevant to the selected attribute.

3. The image display control apparatus according to claim 1, wherein
    the display controller is configured to perform display control to display the position information in an edge portion of the display area so that the position information is located at a nearest position from the location position.

4. The image display control apparatus according to claim 1, wherein
    the display controller is configured to perform display control to display, in response to the displayed position information being selected, an image whose location position is identified by the selected position information on the display.

5. The image display control apparatus according to claim 1, wherein
    the display controller is configured to perform, in response to the relevant image specified by the displayed position information being displayed by scrolling images displayed on the display, display control to stop display of the position information and to display the mark indicating the relevant image.

6. The image display control apparatus according to claim 1, wherein
    the display controller is configured to perform, in response to the mark being displayed on the display, display control to stop display of the mark in response to an instruction for making the mark non-display.

7. The image display control apparatus according to claim 1, wherein
the attributes include information indicating at least one of a date of image capture, an image capture condition, a location of image capture, and a photographer.

8. The image display control apparatus according to claim 1, wherein
the memory is configured to store, upon receiving an input of an attribute for at least one of the plurality of pieces of image information, the received attribute in association with the at least one of the plurality of pieces of image information.

9. An image display apparatus comprising:
the image display control apparatus according to claim 1; and
a display configured to display an image, the display including a touch panel through which information for selecting a displayed image is input.

10. A non-transitory computer readable medium storing a program causing a computer to execute a process, the process comprising:
determining, in response to one of a plurality of images displayed on a display being selected, whether or not any image information stored in a memory indicates a relevant image that is associated with an attribute relevant to an attribute corresponding to the selected image;
performing display control to display a mark indicating each individual relevant image on the display, without grouping image information, in response to displaying the relevant image;
performing display control to display position information indicating a location position of the relevant image on the display, in response to the relevant image completely not being displayed on the display; and
performing display control, in response to the relevant image not being displayed on the display, to display position information indicating a location position of the relevant image on the display together with information indicating a distance from a position at which the position information is displayed to the location position of the relevant age.

11. An image display control method comprising:
determining, in response to one of a plurality of images displayed on a display being selected, whether or not any image information stored in a memory indicates a relevant image that is associated with an attribute relevant to an attribute corresponding to the selected image;
performing display control to display a mark indicating each individual relevant image on the display, without grouping image information, in response to displaying the relevant image;
performing display control to display position information indicating a location position of the relevant image on the display, in response to the relevant image completely not being displayed on the display; and
performing display control, in response to the relevant image not being displayed on the display, to display position information indicating a location position of the relevant image on the display together with information indicating a distance from a position at which the position information is displayed to the location position of the relevant image.

* * * * *